Patented Nov. 3, 1936

2,059,943

UNITED STATES PATENT OFFICE 2,059,943

SYNTHETIC RESINS

George De Witt Graves, Wilmington, Del., assignor to E. I. du Pont de Nemours & Company, Wilmington, Del., a corporation of Delaware No Drawing. Application August 28, 1935, Serial No. 38,330

5 Claims. (Cl. 260—3)

This invention relates to synthetic resins, and more particularly to condensations of naphthanones with aldehydes.

This invention has as an object the preparation of new and useful resins. A further object is the manufacture of improved resins which are compatible with cellulose derivatives and which are also capable of being homogeneously blended with drying oils and waxes. Other objects will appear hereinafter.

I have discovered that resins having the characteristics just mentioned are obtained by condensing an aldehyde with a naphthanone in the presence of a suitable condensing agent. The resins obtained in this manner from beta-naphthanone and formaldehyde are particularly valuable.

The naphthanones used in the practice of this invention are compounds containing a naphthalene nucleus having oxygen doubly bonded to one carbon atom and having the remaining carbon atoms completely saturated either by hydrogen or other substituent groups. These compositions are obtainable by subjecting a naphthol or substituted naphthol to complete ring hydrogenation and converting the resulting alcohol to the corresponding ketone by dehydrogenation or by oxidation.

My new resins are made by reacting the naphthanone with the aldehyde in the presence of catalyst, preferably of an alkaline catalyst, and then isolating and purifying the resulting products.

A suitable apparatus in which to synthesize the resins described herein consists of a vessel fitted with a thermometer, condenser, and loop stirrer.

The following example shows in more detail a method for conducting the reaction:

Example I

Sixty and four-tenths grams of beta-naphthanone and 48.6 grams of 37% aqueous formaldehyde solution were mixed in a suitable vessel, and to this solution was added three grams of potassium hydroxide dissolved in 80 grams of ethyl alcohol. This mixture was refluxed for 0.5 hour, 16.1 grams of 37% aqueous formaldehyde solution were added, and refluxing continued for one hour longer. The reaction mixture was allowed to cool to room temperature, the aqueous layer decanted off, and the resin purified by washing first with hot water, then with a mixture of water and alcohol, and finally with water. The product obtained after drying at room temperature was a light-colored resin, soluble in toluene, butyl acetate, and drying oils, and compatible with nitrocellulose, ethyl cellulose, and waxes.

A resin having properties similar to that of the foregoing example is obtained by replacing the beta-naphthanone with alpha-naphthanone. I may likewise use other naphthanones such as 4-methyl - beta - naphthanone, 4-propyl - beta-naphthanone, 4-methyl-alpha-naphthanone, or 4-butyl-alpha-naphthanone.

In place of the formaldehyde I may use any of its homologs as well as the various compounds known to react similarly to aldehydes in general. Thus, I may condense the naphthanone with one or more of such aldehydic substances as trioxymethylene, paraformaldehyde, hexamethylenetetramine, acetaldehyde, butyraldehyde, acrolein, crotonaldehyde, furfuraldehyde, beta-amino-alpha, alpha-dimethyl propionaldehyde, benzoldehyde, etc. Generally, however, the higher aldehydes are less preferred than formaldehyde because they are more difficult to condense with the naphthanone.

When aldehydes other than formaldehyde are used, the reaction may be conducted in the presence of solvents such as toluene, benzene, chlorobenzene, acetic acid, ethyl alcohol, butyl alcohol, etc.

Temperatures for the reaction should preferably range from 20° C. to about 100° C., the most suitable temperature range, however, being 80° C. to 100° C.

The time required for completion of the reaction varies with the temperature; the lower the temperature the longer the time required for completion of the condensation.

Valuable mixed resins may be made by including in the reaction mixture such materials as phenols, urea, thiourea, aliphatic ketones and cyclic ketones, e. g., the cyclopentanones and cyclohexanones and alkyl derivatives thereof, rosin, and hydrogenated rosin, ester gum and hydrogenated ester gum, maleic anhydride-rosin addition products, etc.

The catalyst is preferably potassium hydroxide, but other alkalies such as sodium hydroxide, calcium hydroxide and the hydroxides of the other alkaline earth metals, and salts such as ammonium chloride, sodium acetate, sodium carbonate and other alkali metal carbonates, sodium phosphate, etc., are also operable to some extent. In some cases acid condensing agents may be used, but these are generally less desirable than the alkaline condensing agents.

The resins of this invention find useful application as ingredients in coating compositions, e. g., in combination with either drying oils, oil-modified polyhydric alcohol-polycarboxylic acid resins, or with cellulose derivatives such as ethyl cellulose, nitrocellulose, cellulose acetate, benzyl cellulose, etc.

Examples of the uses just referred to are given below:

Example II

25-gallon China-wood oil varnish

| | Parts |
|---|---|
| Resin of Example I | 34.00 |
| Raw China-wood oil | 66.00 |
| Total | 100.00 |

The varnish was made by blending the ingredients in the cold, heating up to 225° C. in 16 minutes, and holding at 225°–230° C. for 15 minutes. At the end of this time the mixture was removed from the fire, allowed to cool to about 200° C., and reduced with an equal weight of Hi-flash naphtha. To the varnish solution thus made was added a sufficient amount of cobalt linoleate solution to give 0.01% cobalt (as metal) based on the oil.

The above varnish when sprayed over either steel or wood dries to a tough, hard, highly lustrous, water-resistant film in about 4 hours. After six months' outdoor exposure the varnish film was still in good condition.

Example III

Lacquer composition

| | Parts |
|---|---|
| Resin of Example I | 4.51 |
| Ethyl cellulose | 4.51 |
| Dibutyl phathalate | 1.80 |
| Solvents | 89.18 |
| Total | 100.00 |

Films of the above lacquer are tough, hard, highly lustrous, water-resistant, and when sprayed over either wood or steel yielded films which were still intact after six months' exposure to the weather.

The resins of this invention have the unique property of being highly compatible with waxes such as paraffin wax, Carnauba wax, Japan wax, candelilla, ozokerite, etc., and these resin-wax compositions, with or without plasticizers are useful as moistureproofing coating compositions, as, for example, for use in the production of moistureproof cellulosic sheeting or for the coating of paper, cloth, etc. If desired, cellulose derivatives may be added to such moistureproofing compositions as illustrated in the following example:

Example IV

Moistureproofing lacquer

| | Parts |
|---|---|
| Nitrocellulose (3 seconds) | 5.26 |
| Resin of Example I | 1.0 |
| Dibutyl phathalate | 2.3 |
| Asiatic wax | 1.5 |
| Ethyl acetate | 50.0 |
| Toluene | 27.0 |
| Alcohol | 10.0 |

Sheets of regenerated cellulose, for example, coated with the above composition and dried at 103° C. are substantially transparent, flexible and moistureproof in that they resist the passage of water vapor therethrough at least ten times than uncoated sheets of regenerated cellulose.

Example V

| | Parts |
|---|---|
| Resin of Example I | 10.0 |
| Asiatic wax | 2.6 |
| Toluene | 40.0 |
| Alcohol | 10.0 |

Sheets of regenerated cellulose, for example, coated with the above composition and dried at 100° C. are clear, transparent and moistureproof although the coatings have a tendency to be slightly brittle.

In addition to the particular uses exemplified above, the resins of this invention combine with any one or more of the following: semi-drying and non-drying oils; other natural and synthetic resins such as rosin, kauri, vinyl resins, phenol-aldehyde resins, acrylic and methacrylic acid ester polymers, etc.; hydrogenated natural and synthetic resins, such as hydrogenated phenol-aldehyde resins, hydrogenated rosin, hydrogenated rosin-modified phenol-aldehyde resins, etc.; or with hydrogenated resin acid esters such as hydrogenated ester gum, etc., are useful in all sorts of coating, impregnating, sizing, or molding compositions, adhesives, particularly pressure adhesives, etc.

To the compositions containing any of the above enumerated materials may be added pigments, fillers, dyes, solvents, driers, etc., as needed and desired.

The naphthanone-aldehyde resins described above are highly useful in diverse applications. These resins are particularly valuable in coating compositions based upon cellulose derivatives, oil-modified polyhydric alcohol-polybasic acid resins, and drying oils because they impart to these systems markedly greater water resistance, high initial luster, improved film toughness and enhanced durability upon outdoor exposure. The latter advantage is manifested by the improved resistance to blistering and whitening of compositions made with my new resins even upon prolonged continuous contact with moisture.

As many apparently widely different embodiments of this invention may be made without departing from the spirit and scope thereof, it is to be understood that I do not limit myself to the specific embodiments thereof except as defined in the appended claims.

I claim:

1. The resinous reaction product of a naphthanone and an aldehyde.
2. The resinous reaction product of a naphthanone and formaldehyde.
3. The resinous reaction product of beta-naphthanone and an aldehyde.
4. The resinous reaction product of beta-naphthanone and formaldehyde.
5. Coating composition containing the resinous reaction product of a naphthanone and an aldehyde.

GEORGE DE WITT GRAVES.